United States Patent
Yamaura et al.

(10) Patent No.: US 12,511,959 B2
(45) Date of Patent: Dec. 30, 2025

(54) AUTHENTICATION SYSTEM AND AUTHENTICATION METHOD

(71) Applicant: DENSO CORPORATION, Kariya (JP)

(72) Inventors: Kodai Yamaura, Kariya (JP); Kazuya Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 95 days.

(21) Appl. No.: 18/636,520

(22) Filed: Apr. 16, 2024

(65) Prior Publication Data

US 2024/0257591 A1 Aug. 1, 2024

Related U.S. Application Data

(63) Continuation of application No. PCT/JP2022/038229, filed on Oct. 13, 2022.

(30) Foreign Application Priority Data

Oct. 26, 2021 (JP) .................. 2021-174807

(51) Int. Cl.
G07C 9/00 (2020.01)
H04W 12/06 (2021.01)

(52) U.S. Cl.
CPC ........ *G07C 9/00309* (2013.01); *H04W 12/06* (2013.01); *G07C 2009/00261* (2013.01)

(58) Field of Classification Search
CPC ..... G07C 9/00309; G07C 2009/00261; H04W 12/06
See application file for complete search history.

(56) References Cited

U.S. PATENT DOCUMENTS 10,053,056 B1 8/2018 Zhang et al.
10,176,172 B1 * 1/2019 Clarke .................. G06F 16/00
10,434,988 B2 * 10/2019 Gennermann ........ B60R 25/241
(Continued)

FOREIGN PATENT DOCUMENTS

JP 2009043046 A 2/2009
JP 2018160220 A 10/2018
(Continued)

*Primary Examiner* — Steven Lim
*Assistant Examiner* — Son M Tang
(74) *Attorney, Agent, or Firm* — Harness, Dickey & Pierce, P.L.C.

(57) ABSTRACT

An authentication system includes an in-vehicle unit that is mounted in a vehicle, and a vehicle-exterior apparatus that is provided outside the vehicle. The in-vehicle unit and the vehicle-exterior apparatus are configured to communicate with each other. The in-vehicle unit includes a first vehicle-interior storage unit that stores user related information, a second vehicle-interior storage unit that stores vehicle related information, and a vehicle-interior control unit. The vehicle-exterior apparatus includes a first vehicle-exterior storage unit, a second vehicle-exterior storage unit, and a vehicle-exterior control unit. The vehicle-interior control unit and the vehicle-exterior control unit perform synchronization processing for bi-directionally synchronizing the user related information stored in the first vehicle-interior storage unit and the user related information stored in the shared area in the first vehicle-exterior storage unit with each other.

12 Claims, 14 Drawing Sheets

(56) References Cited

U.S. PATENT DOCUMENTS

| | | | | |
|---|---|---|---|---|
| 10,464,529 | B1* | 11/2019 | Zhang | B60R 25/241 |
| 10,755,504 | B1* | 8/2020 | Kim | H04W 4/80 |
| 2005/0221878 | A1* | 10/2005 | Van Bosch | H04M 3/42272 |
| | | | | 455/575.9 |
| 2014/0070917 | A1* | 3/2014 | Protopapas | B60R 25/25 |
| | | | | 340/3.1 |
| 2014/0167915 | A1* | 6/2014 | Tamada | B60L 53/65 |
| | | | | 340/5.61 |
| 2017/0050617 | A1* | 2/2017 | Penilla | G07F 15/005 |
| 2018/0006810 | A1* | 1/2018 | Ideguchi | H04L 9/3263 |
| 2019/0193681 | A1* | 6/2019 | Ito | B60R 25/246 |
| 2019/0392107 | A1* | 12/2019 | Ricci | G06F 21/44 |
| 2020/0007338 | A1* | 1/2020 | Oh | H04L 9/0866 |
| 2020/0055486 | A1* | 2/2020 | Keating | B62J 45/10 |
| 2020/0226498 | A1* | 7/2020 | Jiwani | G06Q 10/02 |
| 2022/0024414 | A1* | 1/2022 | Isaac | B60R 25/25 |
| 2022/0058329 | A1* | 2/2022 | Ricci | G06F 21/44 |
| 2022/0089120 | A1* | 3/2022 | Hutanu | B60R 25/2018 |
| 2022/0103568 | A1 | 3/2022 | Suenaga et al. | |
| 2022/0109662 | A1* | 4/2022 | Jenkins | H04W 12/35 |
| 2022/0217581 | A1* | 7/2022 | Mu | H04L 5/0053 |
| 2022/0231862 | A1* | 7/2022 | Chen | H04W 12/0471 |

FOREIGN PATENT DOCUMENTS

| | | |
|---|---|---|
| JP | 2020507700 A | 3/2020 |
| JP | 2022057228 A | 4/2022 |

* cited by examiner

FIG. 2

<USER RELATED INFO>

| USER ID | |
|---|---|
| PERMISSION INFO | PERMISSION AUTHORITY |
| | TARGET VEHICLE |
| | VALIDITY PERIOD |
| AUTHENTICATION INFO | |
| SERVICE SETTING | SERVICE ID |
| | SET VALUE INFO |

FIG. 3

<INFORMATION STORED IN USER SETTING DB OF ONBOARD APPARATUS
(SHARED AREA IN USER SETTING DB OF CENTER)>

USER ID: 001

PERMISSION INFO
- PERMISSION AUTHORITY: DRIVING OF VEHICLE
- DRIVING RANGE: WITHIN XXX CITY
- SPEED LIMIT: 60km
- TARGET VEHICLE: 0001, 0002
- VALIDITY PERIOD: DATE/MONTH/YEAR

AUTHENTICATION INFO

SERVICE SETTING
- SERVICE ID: 002 (AUTOMATIC OPERATION)
- SET VALUE INFO{
    DESTINATION SETTING: XXX CORPORATION}

SERVICE SETTING
- SERVICE ID: 003 (AIR CONDITIONER)
- SET VALUE INFO{
    TEMPERATURE: 25°C, AIR FLOW RATE: WEAK}

USER ID: 002

PERMISSION INFO
- PERMISSION AUTHORITY: DRIVING OF VEHICLE
- DRIVING RANGE: WITHIN XXX CITY
- SPEED LIMIT: 60km
- TARGET VEHICLE: 0001, 0002, 0003
- VALIDITY PERIOD: DATE/MONTH/YEAR

AUTHENTICATION INFO

SERVICE SETTING
- SERVICE ID: 002 (AUTOMATIC OPERATION)
- SET VALUE INFO{
    DESTINATION SETTING: XXX CITY HALL}

FIG. 4

<VEHICLE RELATED INFO>

| VIN | |
|---|---|
| USER INFO | USER ID |
| | USER ROLE |
| | VALIDITY PERIOD |

FIG. 5

<INFORMATION STORED IN VEHICLE SETTING DB OF ONBOARD APPARATUS
(SHARED AREA IN VEHICLE SETTING DB OF CENTER)>

- VIN: 0001

USER INFO
  - USER ID: 001
  - USER ROLE: MEMBER OF SALES DIVISION
  - VALIDITY PERIOD: UNLIMITED

USER INFO
  - USER ID: 002
  - USER ROLE: MEMBER OF SALES DIVISION
  - VALIDITY PERIOD: UNLIMITED

USER INFO
  - USER ID: 003
  - USER ROLE: MEMBER OF SALES DIVISION
  - VALIDITY PERIOD: UNLIMITED

⋮

USER INFO
  - USER ID: 010
  - USER ROLE: MEMBER OF SALES DIVISION
  - VALIDITY PERIOD: UNLIMITED

<INFORMATION STORED IN NON-SHARED AREA IN USER SETTING DB OF CENTER>

FIG. 14

<INFORMATION STORED IN NON-SHARED AREA IN VEHICLE SETTING DB OF CENTER>

- VIN: 0001

USER INFO
  - USER ID: 001
  - VEHICLE SERVICE ID: 002 (AUTOMATIC OPERATION APPLICATION)
  - UTILIZATION HISTORY: ONCE
  - ACCUMULATED TIME: 1 HOUR

USER INFO
  - USER ID: 002
  - VEHICLE SERVICE ID: 002 (AUTOMATIC OPERATION APPLICATION)
  - UTILIZATION HISTORY: THREE TIMES
  - ACCUMULATED TIME: 5 HOUR

USER INFO
  - USER ID: 003
  - VEHICLE SERVICE ID: 002 (AUTOMATIC OPERATION APPLICATION)
  - UTILIZATION HISTORY: 0 TIMES
  - ACCUMULATED TIME: 0 HOUR

⋮

USER INFO
  - USER ID: 010
  - VEHICLE SERVICE ID: 002 (AUTOMATIC OPERATION APPLICATION)
  - UTILIZATION HISTORY: TWICE
  - ACCUMULATED TIME: 3 HOUR

AUTHENTICATION SYSTEM AND AUTHENTICATION METHOD

CROSS REFERENCE TO RELATED APPLICATION

The present application is a continuation application of International Patent Application No. PCT/JP2022/038229 filed on Oct. 13, 2022 which designated the U.S. and claims the benefit of priority from Japanese Patent Application No. 2021-174807 filed on Oct. 26, 2021. The entire disclosures of all of the above applications are incorporated herein by reference.

TECHNICAL FIELD

The present disclosure relates to an authentication system and an authentication method that manage a user's utilization of a vehicle.

BACKGROUND

A related art discloses an authentication system used in a vehicle in which an answerback sound is outputted when a door is unlocked and including: a portable terminal carried by a user and a vehicle-side apparatus used in the vehicle. In this authentication system, the vehicle-side apparatus executes a control program stored in a memory and thereby performs varied processing related to authentication at the vehicle.

SUMMARY

An authentication system includes an in-vehicle unit that is mounted in a vehicle, and a vehicle-exterior apparatus that is provided outside the vehicle. The in-vehicle unit and the vehicle-exterior apparatus are configured to communicate with each other. The in-vehicle unit includes a first vehicle-interior storage unit that stores user related information, a second vehicle-interior storage unit that stores vehicle related information, and a vehicle-interior control unit. The vehicle-exterior apparatus includes a first vehicle-exterior storage unit, a second vehicle-exterior storage unit, and a vehicle-exterior control unit. The vehicle-interior control unit and the vehicle-exterior control unit perform synchronization processing for bi-directionally synchronizing the user related information stored in the first vehicle-interior storage unit and the user related information stored in the shared area in the first vehicle-exterior storage unit with each other.

BRIEF DESCRIPTION OF THE DRAWINGS

Objects, features and advantages of the present disclosure will become more apparent from the following detailed description made with reference to the accompanying drawings. In the drawings:

FIG. 2 is a drawing showing an example of a configuration of user related information according to an embodiment;

FIG. 3 is a drawing showing an example of information stored in a user setting DB of an onboard apparatus according to an embodiment;

FIG. 4 is a drawing showing an example of a configuration of vehicle related information according to an embodiment;

FIG. 5 is a drawing showing an example of information stored in a vehicle setting DB of an onboard apparatus according to an embodiment;

FIG. 14 is a drawing showing a modification to information stored in a non-shared area in a vehicle setting DB of a center, according to an embodiment.

DETAILED DESCRIPTION

Figure 1:
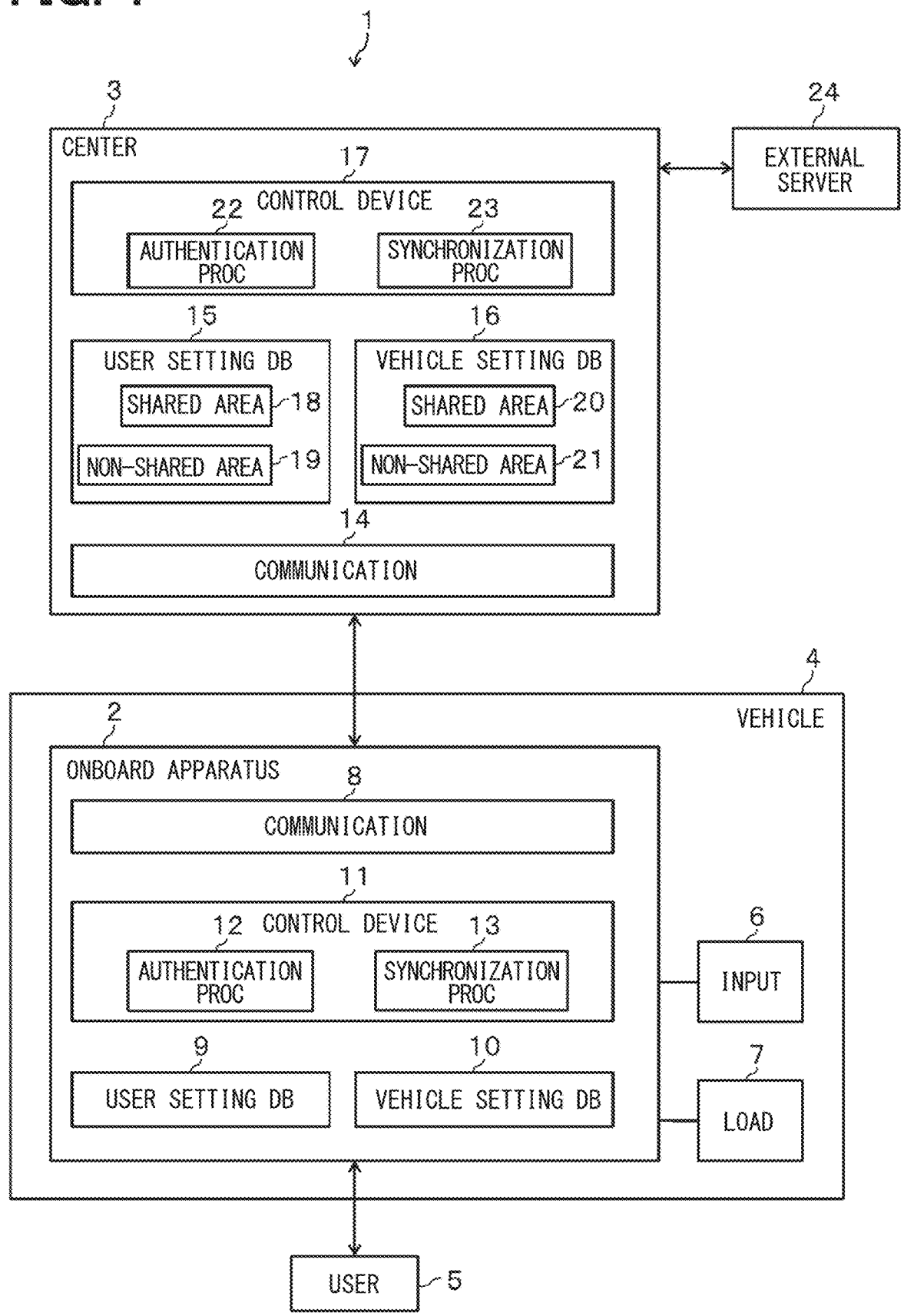
FIG. 1 is a drawing schematically illustrating a configuration of an authentication system according to an embodiment.

There may be cases where a single vehicle is utilized by not only the owner of the vehicle but also such a third parson as a share service user or a car maintenance service provider. In such a case, a conventional authentication system used to pose the following problems. Since a third person must borrow a key and the like to drive a vehicle, it is difficult for the third person to easily utilize the functions of the vehicle. In addition, it is also difficult for a third person to utilize only some of the functions of a vehicle, for example, starting the engine or opening the hood for the purpose of maintenance.

There may be also cases where a vehicle's owner utilizes a company-owned car of his/her company in addition to his/her owned vehicle. In such a case, a conventional authentication system used to pose the following problems. A vehicle's owner may customize a seating position or setting of the air conditioner, or the like of his/her owned vehicle and further purchase a car application as an application for the vehicle from a cloud service and install the application. Even in such a case, to utilize a company-owned car, the vehicle's owner must adjust a seating position or setting of the air conditioner again and cannot use the purchased car application. As mentioned above, the conventional technologies have a room for enhancement with respect to convenience offered when a plurality of users utilize a single vehicle and when a single user utilizes a plurality of vehicles.

The present disclosure provides an authentication system and an authentication method that enable convenience to be enhanced with respect to utilization of a vehicle.

According to one aspect of the present disclosure, an authentication system comprises: an in-vehicle unit that is mounted in a vehicle; and a vehicle-exterior apparatus that is provided outside the vehicle. The in-vehicle unit and the vehicle-exterior apparatus are configured to communicate with each other. The in-vehicle unit includes: a first vehicle-interior storage unit that stores user related information about a user who utilizes the vehicle; a second vehicle-interior storage unit that stores vehicle related information about the vehicle, and a vehicle-interior control unit that performs varied processing. The vehicle-exterior apparatus includes: a first vehicle-exterior storage unit that includes a shared area and a non-shared area for storing the user related information; a second vehicle-exterior storage unit that stores the vehicle related information, and a vehicle-exterior control unit that performs varied processing.

The vehicle-interior control unit and the vehicle-exterior control unit perform synchronization processing for bi-directionally synchronizing the user related information stored in the first vehicle-interior storage unit and the user related information stored in the shared area in the first vehicle-exterior storage unit with each other. Wen utilization of the vehicle is requested from a user, the vehicle-interior control unit performs authentication processing to authenticate a target user, who requested the utilization of the vehicle, based on the user related information stored in the first vehicle-interior storage unit and the vehicle related information stored in the second vehicle-interior storage unit and, and when the target user is successfully authenticated by the authentication processing, the vehicle-interior control unit reflects the user related information corresponding to the target user in the vehicle.

At an information insufficiency time when information corresponding to the target user does not exist in the user related information stored in the first vehicle-interior storage unit or the vehicle related information stored in the second vehicle-interior storage unit, the vehicle-interior control unit or the vehicle-exterior control unit performs the authentication processing based on the user related information stored in the non-shared area in the first vehicle-exterior storage unit. According to the above-mentioned configuration, various users can utilize a single vehicle and further when a single user utilizes a plurality of vehicles, various vehicle settings and the like can be reflected in each vehicle. According to the above-mentioned configuration, therefore, an excellent effect of enhancement of convenience can be obtained with respect to utilization of a vehicle.

Hereafter, a description will be given to an embodiment of an authentication system and an authentication method with reference to the drawings.

As shown in FIG. 1, an authentication system 1 includes an onboard apparatus 2 and a center 3 so configured that the onboard apparatus and the center can communicate with each other. The authentication system 1 manages utilization of vehicle functions as the functions of a vehicle, that is, access to the vehicle functions by a user 5 of the vehicle 4, such as an automobile, by an authentication method including the various procedures described later. In this case, in the authentication system 1, access to the vehicle functions and the user 5 are separated from each other and can be independently managed and set.

Utilization of the vehicle functions, cited here, is that a predetermined operation is performed with respect to the vehicle 4 and examples of the utilization include: locking/unlocking of a door lock, opening/closing of a door, opening/closing of a window, operation of an electric seat, starting/stopping of an engine, operation of an air conditioner, operation of an automobile navigation system, operation of an audio device, various operations related to automatic operation, and the like. In FIG. 1, those implementing such vehicle functions are represented by two functional blocks, an input 6 and a load 7.

With respect to utilization of the vehicle functions, a combination of a plurality of operations may be taken as utilization of one vehicle function. For example, a series of operations required for running a vehicle may be taken as a vehicle driving function. In this case, the vehicle driving function includes unlocking of a door lock, opening/closing of a window, operation of an electric seat, starting/stopping of an engine, and an operation of an air conditioner.

Examples of the input 6 include input related to setting of a seat position, input related to air conditioner setting, input implemented by operating an automobile navigation system, and the like. The input 6 includes, for example, a switch, a touch panel, and the like as input devices. The load 7 includes a device for locking/unlocking a door lock, a device for opening/closing a window, a device for operating an electric seat, and the like. In this case, in addition to the owner of the vehicle 4, such a third person as a family member of the owner, a share service user, and a car maintenance service provider, is also assumed as the user 5 and authorization of utilization of each vehicle function, that is, permission or prohibition of utilization is set for each user.

The onboard apparatus 2 is mounted and used in the vehicle 4 and functions as an in-vehicle unit. The onboard apparatus 2 is used, for example, in the vehicle 4. The onboard apparatus 2 includes a communication unit 8, a user setting database 9, a vehicle setting database 10, and a control device 11. In the present specification, a database may be abbreviated as DB. The communication unit 8 conducts communication with the center 3 and sends and receives varied data.

The user setting DB 9 is DB for storing user related information related to the user 5 who utilizes the vehicle 4 and functions as a first vehicle-interior storage unit. The user related information cited here is information for managing and recording an operation permitted for each user 5, that is, authorization of utilization of a vehicle function, a permitted vehicle, a time limit, a service, and the like. The user related information is composed of such information as shown in FIG. 2. That is, the user related information includes a user ID, permission information, authentication information, and service setting. ID is an abbreviation of identification.

The user ID is character information assigned to each user for identifying the user and is equivalent to user identification information. The permission information is information representing authorization of utilization of a vehicle function. The permission information includes permission authority, a target vehicle and a validity period. The authentication information is information for authenticating a user and is information in which a user ID and such a key as a smart key are associated with each other. The service setting is information representing setting of each of various services related to the vehicle 4 and examples of the service setting include setting of an air conditioner, setting of a seat position, setting of automatic operation, and the like. The service setting includes a service ID and a set value information.

The authentication processing in the present specification is a process for confirming who is the user. In the authentication processing, a user is identified based on ID information checked, for example, by an authentication apparatus (also, referred to as authentication device, authentication system). In the following description, an authentication apparatus may be referred to as authentication device or authentication system sometimes. The permission processing in the present specification is a process of confirming who is requesting what to do with respect to which resource and determining whether to permit or prohibit. In the present specification, however, a combination of authentication processing and permission processing may be referred to as authentication processing sometimes. In the present specification, the authentication processing may mean sometimes that who is the user 5 desiring to utilize the vehicle 4 is identified and that whether the user 5 should be permitted to utilize the user's requesting vehicle function is confirmed.

The user related information stored in the user setting DB 9 of the onboard apparatus 2 is specifically suck information as shown in FIG. 3, for example. In this case, the user setting DB 9 holds user related information corresponding to a user whose user ID is "001" and a user whose user ID is "002." These users are users who have actually utilized the vehicle 4. As described later, when a user who has not utilized the vehicle 4 ever utilizes the vehicle 4 for the first time, the user related information of the user is transferred from the center 3 and is stored in the user setting DB 9. The permission information includes, for example, such permission authority as "driving of vehicle," "opening door," and "opening trunk" and such an area specification as "within ○○ city within xx city." Further, the permission information may include, for example, such a speed limit as "60 km." The permission information includes permission authority and permission condition.

A target vehicle in permission information is information indicated by VIN, for example, "0001," "0002," and "0003," corresponding to a targeted vehicle. VIN is an abbreviation of Vehicle Identification Number. VIN is character information assigned to each vehicle identifying the vehicle and is equivalent to vehicle identification information. VIN need not be used as vehicle identification information and any information is acceptable as long as a vehicle can be identified. The validity period is information indicating a time limit, for example, "year ○○ month ∆∆ day xx" until which utilization of a vehicle function is permitted.

The service ID in service setting is character information assigned to each service for identifying such a service as "002 (automatic operation)" or "003 (air conditioning)", for example. The set value information in service setting is information indicating a set value of a service, such as "destination: ○○ corporation," "destination: ∆∆ city hall," "temperature: 25° C.," and "air flow rate: weak," for example. Therefore, the set value information differs from service to service specified by a service ID.

The vehicle setting DB 10 is DB for storing vehicle related information related to the vehicle 4 and functions as a second vehicle-interior storage unit. The vehicle related information cited here is information for managing and recording such information as a user permitted for each vehicle and a validity period. The vehicle related information is composed of such information as shown in FIG. 4. That is, the vehicle related information includes VIN and user information. The user information includes a use ID, a user roll, and a validity period. The vehicle related information stored in the vehicle setting DB 10 of the onboard apparatus 2 is specifically such information as shown in FIG. 5, for example.

In this case, the vehicle setting DB 10 holds information about the vehicle 4 mounted with the onboard apparatus 2, that is, vehicle related information corresponding to the vehicle 4 whose VIN is "0001"; and the vehicle related information includes user information about each of 10 users who are entitled to the vehicle 4 and whose user ID is "001" to "010." The user role in user information is information representing an attribute, for example, "member of sales division" of a user. Aside from the foregoing, the user role can include "owner," "family member," "share service user," "car maintenance service provider," and the like. The validity period in user information is information, for example, "unlimited" indicating a time limit until which utilization of the vehicle 4 is permitted.

The control device 11 is configured based on a microcomputer including CPU, ROM, RAM, I/O, and the like and functions as a vehicle-interior control unit that conducts varied processing. The control device 11 includes functional blocks, an authentication processing unit 12 that performs authentication processing and a synchronization processing unit 13 that performs synchronization processing. The contents of the authentication processing and the synchronization processing will be described later. Each functional block is implemented by the CPU of the control device 11 executing a computer program stored in such a non-transitional tangible storing medium as ROM to perform processing corresponding to the computer program, that is, is implemented by software. Each functional block may be so configured that the functional block is partly or wholly implemented by hardware.

The center 3 is a data management center including a server provided outside the vehicle 4 and functions as a vehicle-exterior apparatus. The center 3 includes a communication unit 14, a user setting DB 15, a vehicle setting DB 16, and a control device 17. The communication unit 14 conducts communication with the onboard apparatus 2 of the vehicle 4 and sends and receives varied data. The user setting DB 15 is DB for storing user related information and functions as a first vehicle-exterior storage unit. The control device 17 corresponds to a vehicle-exterior control unit.

The user setting DB 15 includes a shared area 18 and a non-shared area 19. As the result of the synchronization processing described later, user related information stored in the shared area 18 is identical with information stored in the user setting DB 9 of the onboard apparatus 2. Meanwhile, user related information stored in the non-shared area 19 is distinctive information that is not stored in the user setting DB 9 of the onboard apparatus 2 and exists only in the user setting DB 15 of the center 3.

In the description of the present embodiment, the vehicle 4 whose VIN is "0001" is taken as origin. Therefore, information stored in the user setting DB 9 of the onboard apparatus 2 of the vehicle 4 whose VIN is "0001 and user related information stored in the shared area 18 of the center 3 are identical with each other. Also, with respect to the vehicle 4 whose VIN is "0002," information stored in the user setting DB 9 and user related information stored in the shared area 18 are identical with each other. However, with respect to the vehicle 4 whose VIN is "0001," user related information stored in the shared area 18 is different from user related information stored in the shared area 18 with respect to the vehicle 4 whose VIN is "0002." That is, the shared area 18 and the non-shared area 19 vary according to a targeted vehicle 4. This is also the case with a shared area 20 and a non-shared area 21 of the vehicle setting DB 16.

Figure 6:
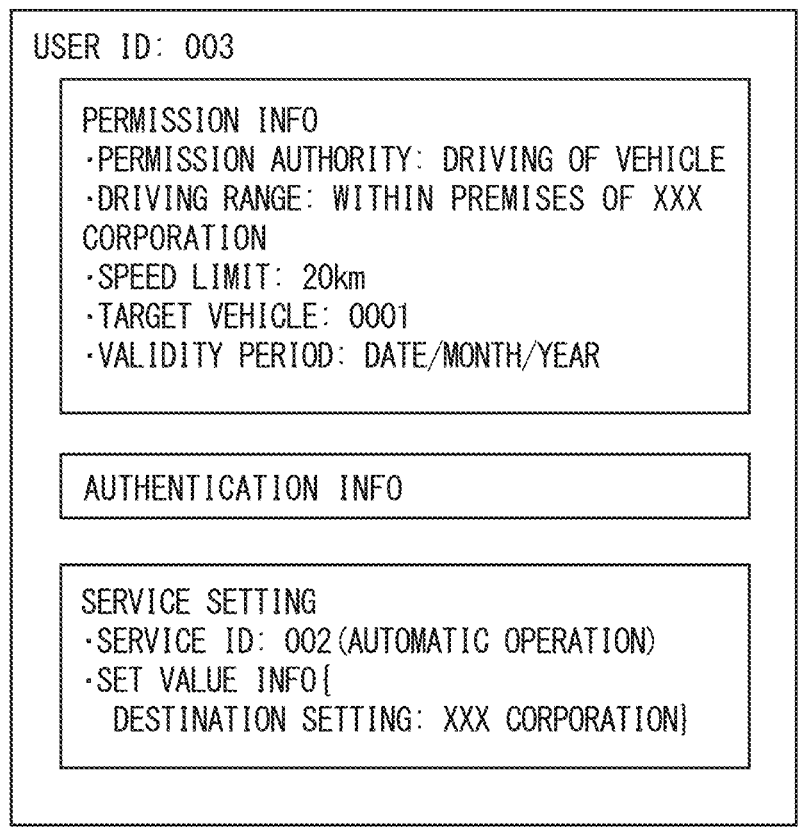
FIG. 6 is a drawing showing an example of information stored in a non-shared area in a user setting DB of a center according to an embodiment.

The user related information stored in the non-shared area 19 in the user setting DB 15 of the center 3 is specifically such information as shown in FIG. 6, for example. In this case, the non-shared area 19 of the user setting DB 15 holds user related information corresponding to a user whose user ID is "003." This user is a user who has not actually utilized the vehicle 4, that is, a prospective user. In this case, "within premises of ○○ corporation" is presented as an example of area specification and "20 km" is presented as an example of speed limit.

The vehicle setting DB 16 is DB for storing vehicle related information and functions as a second vehicle-exterior storage unit. The vehicle setting DB 16 includes the shared area 20 and the non-shared area 21. As the result of the synchronization processing described later, vehicle related information stored in the shared area 20 is identical with information stored in the vehicle setting DB 10 of the onboard apparatus 2. Meanwhile, vehicle related information stored in the non-shared area 21 is distinctive information that is not stored in the vehicle setting DB 10 of the onboard apparatus 2 and exists only in the vehicle setting DB 16 of the center 3. In the description of the present embodiment, the vehicle 4 is taken as origin. Therefore, user information in the non-shared area 19 and information in the non-shared area 21 are just not shared with information in the user setting DB 9 or information in the vehicle setting DB 10 provided in the vehicle 4 and can be shared in any other vehicle 4 than the vehicle 4.

As indicated in FIG. 5, user information of a user who can utilize the vehicle 4 is entered in information stored in the vehicle setting DB 10 of the onboard apparatus 2 and these pieces of information also include a user ID of a user who has not utilized the vehicle 4 ever. For this reason, when a user who has not utilized the vehicle 4 and is set as entitled to the vehicle 4 utilizes the vehicle 4 for the first time, information of the relevant user ID may not exist in the user setting DB 9 of the onboard apparatus 2 even though the user ID has been entered in the vehicle setting DB 10 of the onboard apparatus 2.

Figure 7:
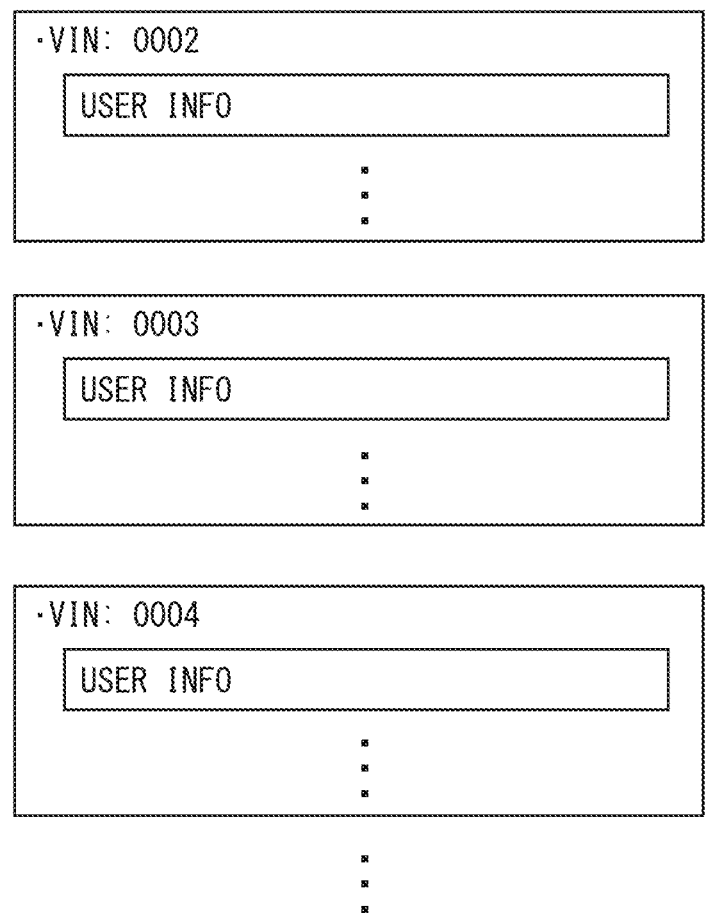
FIG. 7 is a drawing showing an example of information stored in a non-shared area in a vehicle setting DB of a center according to an embodiment.

The vehicle setting information stored in the non-shared area 21 in the vehicle setting DB 16 of the center 3 is specifically such information as shown in FIG. 7, for example. In this case, the non-shared area 21 in the vehicle setting DB 16 holds vehicle related information corresponding to all the vehicles other than the vehicle 4 mounted with the onboard apparatus 2, that is, the vehicle 4 whose VIN is "0001."

The control device 17 is configured based on a microcomputer including CPU, ROM, RAM, I/O, and the like and functions a vehicle-interior control unit that conducts varied processing. The control device 17 includes functional blocks, an authentication processing unit 22 that performs authentication processing and a synchronization processing unit 23 that performs synchronization processing. Each functional block is implemented by the CPU of the control device 17 executing a computer program stored in such a non-transitional tangible storing medium as ROM to perform processing corresponding to the computer program, that is, is implemented by software. Each functional block may be so configured that the functional block is partly or wholly implemented by hardware.

In the above-mentioned configuration, the synchronization processing unit 13 of the onboard apparatus 2 and the synchronization processing unit 23 of the center 3 perform synchronization processing for bi-directionally synchronizing user related information stored in the user setting DB 9 of the onboard apparatus 2 and user related information stored in the shared area 18 in the user setting DB 15 of the center 3. In this case, during synchronization processing, the synchronization processing units 13, 23 also bi-directionally synchronize vehicle related information stored in the vehicle setting DB 10 of the onboard apparatus 2 and vehicle related information stored in the shared area 20 in the vehicle setting DB 16 of the center 3.

"Bi-directionally synchronizing" cited here means that data stored in the user setting DB 9 of the onboard apparatus 2 and data stored in the shared area 18 in the user setting DB 15 of the center 3 are kept identical with each other. Therefore, when user related information stored in the user setting DB 9 of the onboard apparatus 2 is altered, user related information stored in the shared area 18 in the user setting DB 15 of the center 3 is also altered. On the contrary, when user related information stored in the shared area 18 of the user setting DB 15 of the center 3 is altered, user related information stored in the user setting DB 9 of the onboard apparatus 2 is also altered.

This is also the case with vehicle related information stored in the vehicle setting DB 10 of the onboard apparatus 2 and vehicle related information stored in the shared area 20 in the vehicle setting DB 16 of the center 3. When user related information stored in the vehicle setting DB 10 of the onboard apparatus 2 is altered, vehicle related information stored in the shared area 20 in the vehicle setting DB 16 of the center 3 is also altered. When vehicle related information stored in the shared area 20 of the vehicle setting DB 16 of the center 3 is altered, vehicle information stored in the vehicle setting DB 10 of the onboard apparatus 2 is also altered.

The center 3 is so configured that the center can communicate with an external server 24. The external server 24 is accessible to the user 5. Through the external server 24, the user 5 can make such a modification as addition and deletion of a user who utilizes the vehicle 4, such a modification as addition and deletion of authority of utilization of each vehicle function of each user, a modification of various settings of the vehicle 4, and the like. When such a modification is made, the external server 24 is so configured as to send the information of the modification to the center 3. Based on modification information given from the external server 24, the center 3 updates each information stored in the user setting DB 15 and the vehicle setting DB 16. The center 3 and the external server 24 may be configured of a single server.

In the above-mentioned configuration, when utilization of the vehicle 4, that is, utilization of a vehicle function is requested from the user 5, the authentication processing unit 12 of the onboard apparatus 2 performs authentication processing; that is, the authentication processing unit authenticates the target user, who is the user 5 requesting utilization of the vehicle 4, based on user related information stored in the user setting DB 9 and vehicle related information stored in the vehicle setting DB 10. When the target user is successfully authenticated by the authentication processing, the control device 11 of the onboard apparatus 2 reflects service setting contained in user related information corresponding to the target user in the vehicle 4. For authentication processing, aside from a physical key or a FOB key, authentication is performed based on at least any one of a plurality of different authentication methods, including biometric authentication and smartphone authentication.

When information corresponding to a target user does not exist in user related information stored in the user setting DB 9 or vehicle related information stored in the vehicle setting DB 10 of the onboard apparatus 2 in this case, the authentication processing unit 12 of the onboard apparatus 2 or the authentication processing unit 22 of the center 3 performs authentication processing based on user related information stored in the non-shared area 19 in the user setting DB 15 of the center 3. In the following description, an occasion when information corresponding to a target user does not exist in user related information stored in the user setting DB 9 of the onboard apparatus 2 or vehicle related information stored in the vehicle setting DB 10 may be referred to as an information insufficiency time sometimes.

That is, at an information insufficiency time, with the above-mentioned configuration, the authentication processing unit 12 of the onboard apparatus 2 can perform authentication processing based on user related information stored in the non-shared area 19 in the user setting DB 15 of the center 3. Hereafter, that at an information insufficiency time, the authentication processing unit 12 of the onboard apparatus 2 performs authentication processing as mentioned above will be referred to as "vehicle-interior authentication is performed at an information insufficiency time." To perform vehicle-interior authentication at an information insufficiency time, the authentication processing unit 12 of the onboard apparatus 2 transfers user related information stored in the non-shared area 19 in the user setting DB 15 of center 3, that is, downloads user related information from the non-shared area 19 in the user setting DB 15 of the center 3 before performing authentication processing.

At an information insufficiency time, with the above-mentioned configuration, the authentication processing unit 22 of the center 3 can perform authentication processing based on user related information stored in the non-shared area 19 in the user setting DB 15 of the center 3. Hereafter, that at an information insufficiency time, the authentication processing unit 22 of the center 3 performs authentication processing as mentioned above will be referred to as "vehicle-exterior authentication is performed at an information insufficiency time." To perform vehicle-exterior authentication at an information insufficiency time, the authentication processing unit 22 of the center 3, after execution of the authentication processing, transfers user related information stored in the non-shared area 19 in the user setting DB 15 of the center 3 to the user setting DB 9 of the onboard apparatus 2. As a result, user related information stored in the non-shared area 19 in the user setting DB 15 of the center 3 is additionally stored in the user setting DB 9 of the onboard apparatus 2.

With the above-mentioned configuration, when at least either of information stored in the user setting DB 15 and information stored in the vehicle setting DB 16 of the center 3 is updated in an offline state, which is a state in which communication is infeasible between the onboard apparatus 2 and the center 3, the following takes place: when an online state, which is a state in which communication is feasible between the onboard apparatus 2 and the center 3, is thereafter established, synchronization processing is performed. With the above-mentioned configuration, further, when at least either of information stored in the user setting DB 9 and information stored in the vehicle setting DB 10 of the onboard apparatus 2 is updated in an offline state, the following takes place: when an online state is thereafter established, synchronization processing is performed.

A detailed description will be given to an authentication method implemented by the authentication system 1 configured as mentioned above in accordance with concrete examples.

Figure 8:
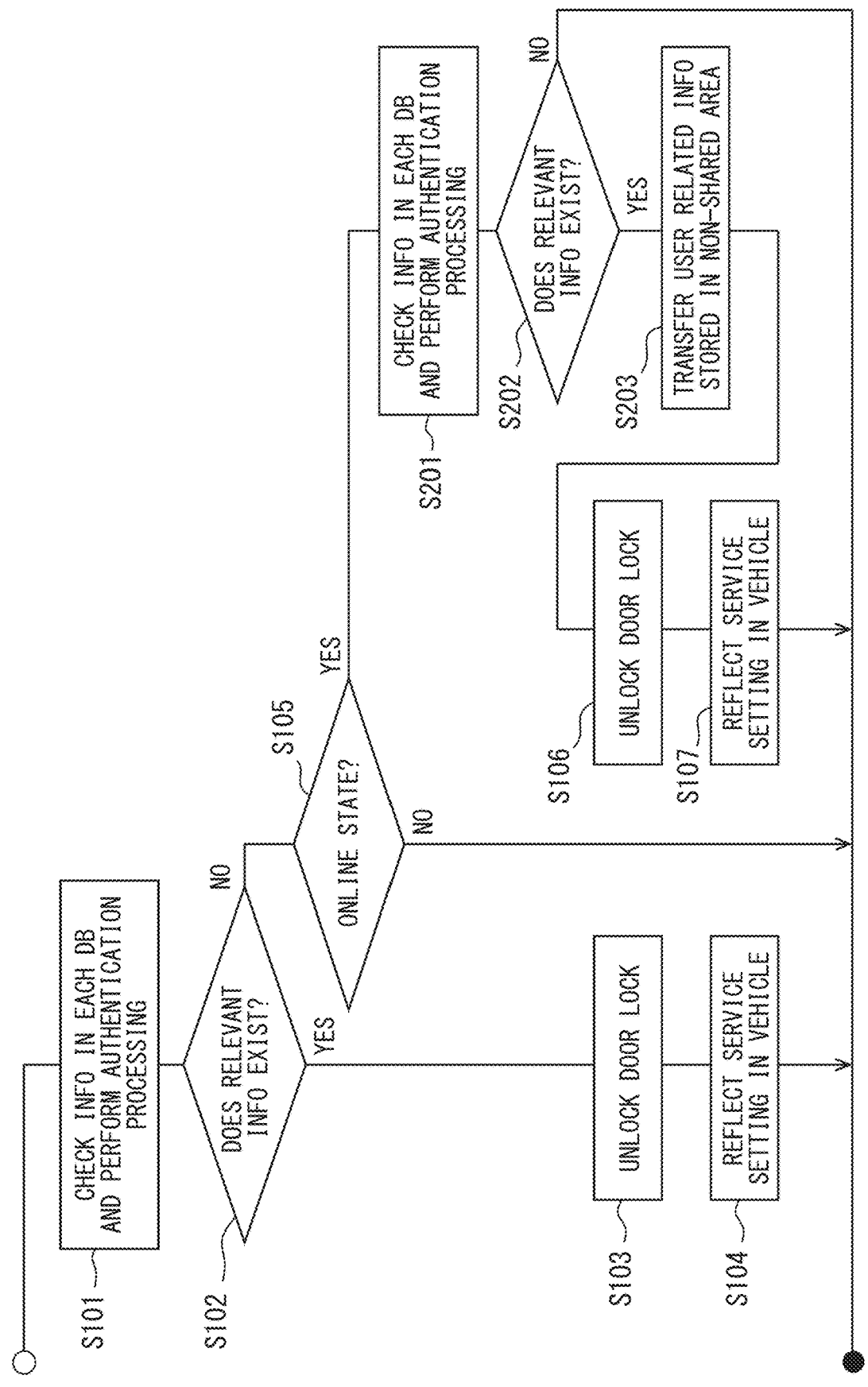
FIG. 8 is a drawing showing an example of the contents of processing related to user authentication performed in cases where vehicle-exterior authentication is performed at an information insufficiency time, according to an embodiment.

[1] User Authentication Performed in Case Where Vehicle-Exterior Authentication is Performed at Information Insufficiency Time User authentication processing used when vehicle-exterior authentication is performed at an information insufficiency time may be as shown in FIG. 8, for example. This case is on the assumption that authentication is performed when the user 5 is about to get in the vehicle 4 for utilization. As shown in FIG. 8, this processing is initiated when the user 5 performs a predetermined operation or takes a predetermined action to request utilization of the vehicle 4. In FIG. 8 and the other like figures, the initiation of processing is indicated by a hollow circle and the termination of processing is indicated by a solid black circle.

In response thereto, at Step S101, the authentication processing unit 12 of the onboard apparatus 2 checks each piece of information stored in the user setting DB 9 and the vehicle setting DB 10 and performs authentication processing based on these pieces of information. At Step S102, the authentication processing unit 12 of the onboard apparatus 2 determines whether information corresponding to the user 5 exists in each piece of information checked at Step S101, that is, whether relevant information exists. When information corresponding to the user 5 exists, a "YES" judgment is made at Step S102, and when the user 5 is successfully authenticated by the authentication processing, the processing proceeds to Step S103. When a "YES" judgment is made at Step S102 and authentication of the user 5 fails in the authentication processing, an error occurs and the processing is terminated.

At Step S103, the control device 11 of the onboard apparatus 2 unlocks a door lock and at Step S104, subsequently, the control device reflects service settings, such as setting of a seat position and setting of an air conditioner, contained in user related information corresponding to the user 5 in the vehicle 4. After execution of Step S104, the user authentication processing is terminated. In this case, as the result of successful authentication, the user can get in the vehicle 4 and can further utilize each vehicle function permitted based on predetermined utilization authority. In this case, a desired set value has been already reflected with respect to service setting, such as setting of a seat position and setting of an air conditioner; therefore, the user 5 need not separately make an adjustment. Step S103 and Step S104 are equivalent to utilization of a vehicle function specified by a service ID and reflection of set value information in a vehicle. Step S106 and Step S107, described later, are also equivalent to utilization of a vehicle function specified by a service ID and refection of set value information in a vehicle.

When information corresponding to the user 5 does not exist in each piece of information checked at Step S101, at Step S102, a "NO" judgment is made and the processing proceeds to Step S105. At Step S105, the control device 11 of the onboard apparatus 2 determines whether an online state has been established. When an online state has not been established, that is, an offline state has been established, at Step 105, a "NO" judgment is made, and the user authentication processing is terminated. In this case, it turns out that authentication has failed and the user 5 cannot get in the vehicle 4.

In case of an online state, meanwhile, at Step S105, a "YES" judgment is made and the authentication processing unit 12 of the onboard apparatus 2 makes an inquiry to the authentication processing unit 22 of the center 3 about authentication of the user 5. In response thereto, at Step S201, the authentication processing unit 22 of the center 3 checks each piece of information stored in the non-shared area 19 in the user setting DB 15 and in the vehicle setting DB 16 and performs authentication processing based on these pieces of information. At Step S202, the authentication processing unit 22 of the center 3 determines whether information corresponding to the user 5 exists in each piece of information checked at Step S201, that is, whether relevant information exists.

When information corresponding to the user 5 does not exist, at Step S202, a "NO" judgment is made and the user authentication processing is terminated. In this case, it turns out that authentication has failed and the user 5 cannot get in the vehicle 4. In this case, further, the center 3 may notify the onboard apparatus 2 that the authentication has failed. A notification unit of the onboard apparatus 2 may notify the user 5 that the authentication has failed. Meanwhile, when information corresponding to the user 5 exists in the information checked at Step S201, at Step S202, a "YES" judgment is made and when the user 5 is successfully authenticated by the authentication processing, the processing proceeds to Step S203. At Step S203, the authentication processing unit 22 of the center 3 transfers user related information stored in the non-shared area 19 in the user setting DB 15 of the center 3 to the user setting DB 9 of the onboard apparatus 2.

As a result, the user setting DB 9 of the onboard apparatus 2 is updated. Thereafter, at Step S106, the control device 11 of the onboard apparatus 2 unlocks a door lock and at Step S107, subsequently, the control device reflects service settings contained in user related information corresponding to the user 5 in the vehicle 4. After execution of Step S106, the user authentication processing is terminated. In this case, similarly to cases where user authentication processing is terminated after execution of Step S104, the user 5 can get in the vehicle 4 and utilize various vehicle functions or perform other like operations.

Figure 9:
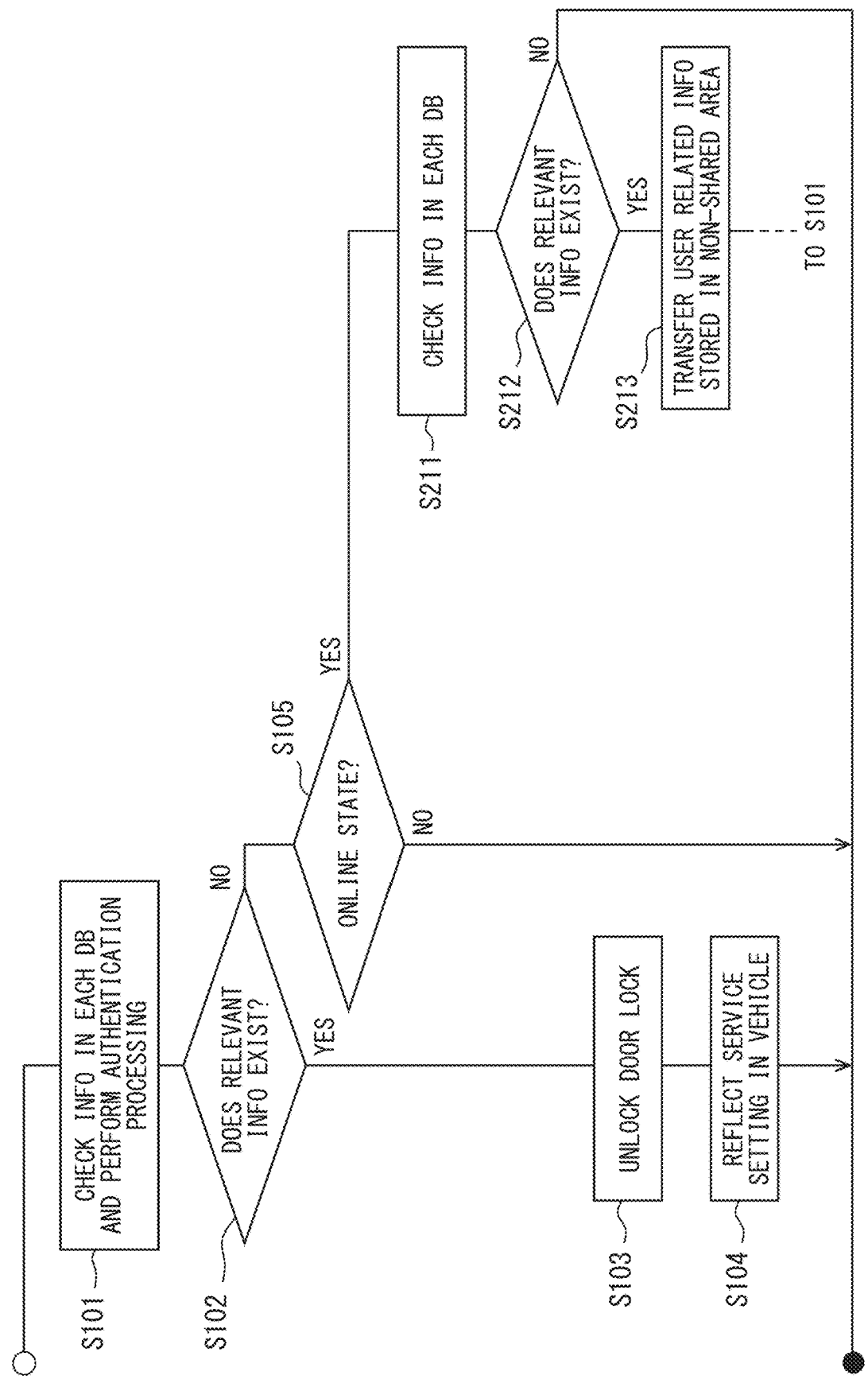
FIG. 9 is a drawing showing an example of the contents of processing related to user authentication performed in cases where vehicle-interior authentication is performed at an information insufficiency time, according to an embodiment.

[2] User Authentication Performed in Case Where Vehicle-Interior Authentication is Performed at Information Insufficiency Time User authentication processing used when vehicle-interior authentication is performed at an information insufficiency time may be as shown in FIG. 9, for example. This case is also on the assumption that authentication is performed when the user 5 is about to get in the vehicle 4 for utilization. The user authentication processing shown in FIG. 9 is different from the user authentication processing shown in FIG. 8 in that: Steps S106 and S107 are omitted and Steps S211 to S213 are provided in place of Steps S201 to S203. In this case, at Step S211, the authentication processing unit 22 of the center 3 checks each piece of information stored in the non-shared area 19 in the user setting DB 15 and in the vehicle setting DB 16.

At Step S212, the authentication processing unit 22 of the center 3 determines whether information corresponding to the user 5 exists in each piece of information checked at Step S211, that is, whether relevant information exists. When information corresponding to the user 5 does not exist, at Step S212, a "NO" judgment is made and the user authentication processing is terminated. In this case, it turns out that authentication has failed and the user 5 cannot get in the vehicle 4. Meanwhile, when information corresponding to the user 5 exists information checked at Step S211, at Step 212, a "YES" judgment is made and the processing proceeds to Step S213.

At Step S213, the authentication processing unit 22 of the center 3 transfers user related information stored in the non-shared area 19 in the user setting DB 15 of the center 3 to the user setting DB 9 of the onboard apparatus 2. As a result, the user setting DB 9 of the onboard apparatus 2 is updated. After execution of Step S213, the processing returns to Step S101. As mentioned above, the user setting DB 9 is updated by adding user related information stored in the non-shared area 19 in the user setting DB 15 of the center 3. At Step S101 performed again, in this case, the authentication processing unit 12 of the onboard apparatus 2 checks each piece of information stored in the user setting DB 9 and the vehicle setting DB 10 and performs authentication processing based on these pieces of information.

Figure 10:
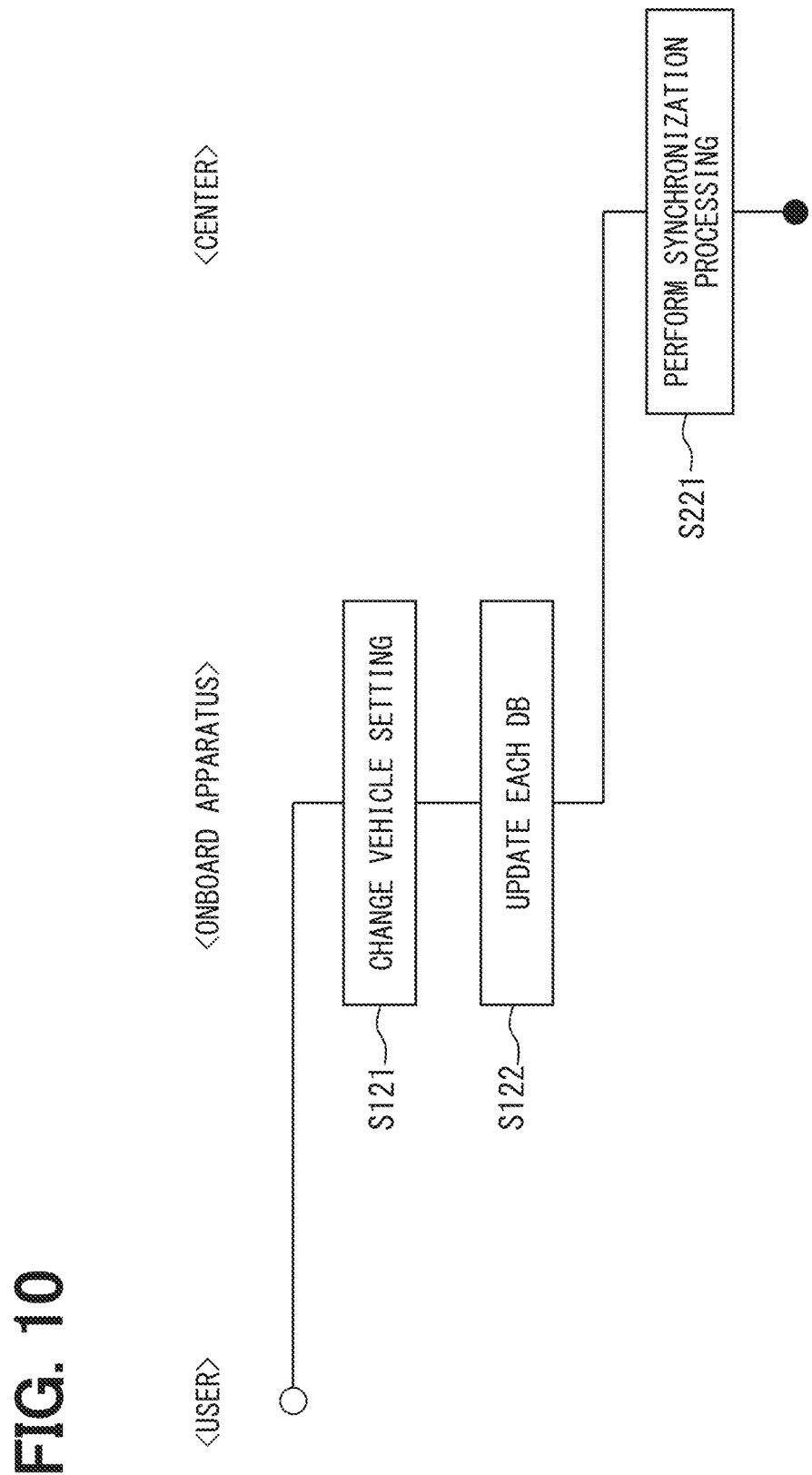
FIG. 10 is a drawing showing an example of the contents of processing related to synchronization processing performed when onboard apparatus-side information is updated online, according to an embodiment.

[3] Synchronization Processing Performed when Onboard Apparatus-Side Information is Updated Online Processing related to synchronization processing used when each piece of information stored in the user setting DB 9 and the vehicle setting DB 10 of the onboard apparatus 2 is updated in an online state may be as shown in FIG. 10, for example. As shown in FIG. 10, this processing is initiated when the user 5 gets in the vehicle 4 and makes an operation to change vehicle settings, which are various settings related to the vehicle 4. In response thereto, at Step S121, the control device 11 of the onboard apparatus 2 makes a vehicle setting change.

At Step S122, subsequently, the control device 11 of the onboard apparatus 2 updates each piece of information stored in the user setting DB 9 and the vehicle setting DB 10 in accordance with the vehicle setting change. In response thereto, at Step S221, the synchronization processing unit 23 of the center 3 updates each piece of information stored in the shared area 18 of the user setting DB 15 and the shared area 20 of the vehicle setting DB 16 to synchronize the information with each piece of information stored in the user setting DB 9 and the vehicle setting DB 10 of the onboard apparatus 2, that is, performs synchronization processing. After execution of Step S221, the processing related to synchronization processing is terminated.

Figure 11:
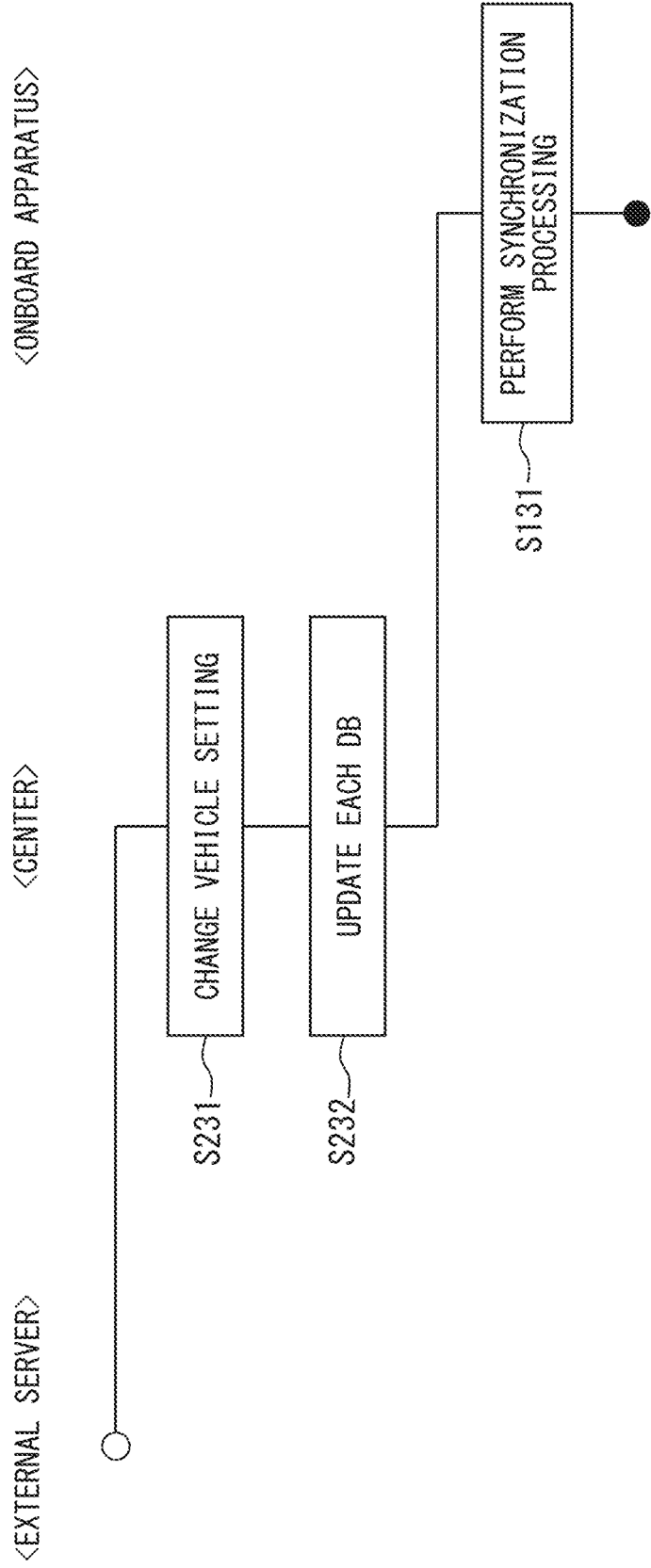
FIG. 11 is a drawing showing an example of the contents of processing related to synchronization processing performed when center side information is updated online, according to an embodiment.

[4] Synchronization Processing Performed when Center Side Information is Updated Online Processing related to synchronization processing used when each piece of information stored in the user setting DB 15 and vehicle setting DB 16 of the center 3 is updated in an online state may be as shown in FIG. 11, for example. As shown in FIG. 11, this processing is initiated when the user 5 performs an operation to change vehicle setting through the external server 24. In response thereto, at Step S231, the control device 17 of the center 3 makes a vehicle setting change.

Then, at Step S232, the control device 17 of the center 3 updates each piece of information stored in the shared area 18 in the user setting DB 15 and the shared area 20 in the vehicle setting DB 16 according to the vehicle setting change. In response thereto, at Step S131, the synchronization processing unit 13 of the onboard apparatus 2 updates each piece of information stored in the user setting DB 9 and the vehicle setting DB 10 to synchronize the information with each piece of information stored in the shared area 18 in the user setting DB 15 and the shared area 20 in the vehicle setting DB 16 of the center 3, that is, performs synchronization processing. After execution of Step S131, the processing related to synchronization processing is terminated.

Figure 12:
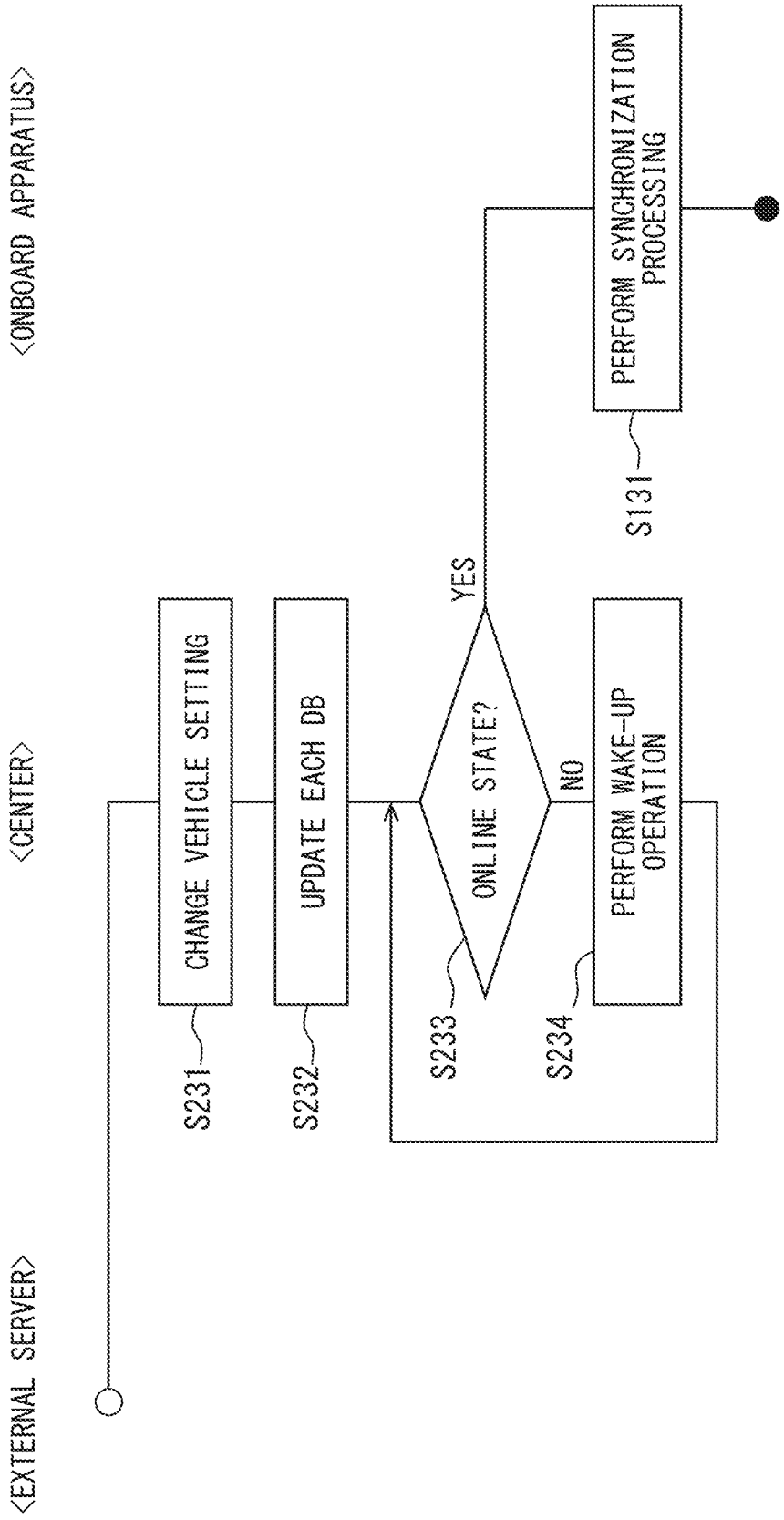
FIG. 12 is a drawing showing an example of the contents of processing related to synchronization processing performed when center side information is updated offline, according to an embodiment.

[5] Synchronization Processing Performed when Center Side Information is Updated Offline Processing related to synchronization processing used when each piece of information stored in the user setting DB 15 and vehicle setting DB 16 of the center 3 is updated in an offline state may be as shown in FIG. 12, for example. The processing related to synchronization processing shown in FIG. 12 is different from the processing related to synchronization processing shown in FIG. 11 in that Steps S233 and S234 are added and the like. In this case, after execution of Step S232, the processing proceeds to Step S233.

At Step S233, the control device 17 of the center 3 determines whether an online state has been established. When an online state has been established, at Step 233, a "YES" judgment is made and the processing proceeds to Step S131. Meanwhile, when an online state has not been established, that is, an offline state has been established, at Step 233, a "NO" judgment is made and the processing proceeds to Step S234. When a predetermined time passes after ignition-off, the onboard apparatus 2 makes a transition to a sleep state. When the onboard apparatus 2 has made a transition to a sleep state, communication is infeasible between the onboard apparatus 2 and the center 3. In this case, when the onboard apparatus 2 makes a transition from a sleep state to a normal state, a transition is accordingly made from an offline state to an online state.

Consequently, at Step S234, the control device 17 of the center 3 performs a wake-up operation to transfer the onboard apparatus 2 from a sleep state to a normal state. After execution of Step S234, Step S233 is performed again. Step S234 can be omitted. To omit Step S234, when at Step S233, a "NO" judgment is made, Step S233 only has to be performed again. In cases where the vehicle 4 is present out of the range of communication or under repair, the onboard apparatus 2 may not make a transition to a normal state even if a wake-up operation is instructed from the center 3. Consequently, the following measure may be taken: the control device 17 of the center 3 counts a number of times of execution of wake-up operation and when a number of times of execution of wake-up operation becomes equal to a predetermined number of times or more, the control device 17 is prevented from performing a wake-up operation for a certain period of time.

According to this processing, Step S233 is repeatedly performed until an online state is established. In an online state, at Step S131, the synchronization processing unit 13 of the onboard apparatus 2 updates each piece of information stored in the user setting DB 9 and the vehicle setting DB 10 to synchronize the information with each piece of information stored in the shared area 18 in the user setting DB 15 and the shared area 20 in the vehicle setting DB 16 of the center 3, that is, performs synchronization processing. After execution of Step S131, the processing related to synchronization processing is terminated.

Figure 13:
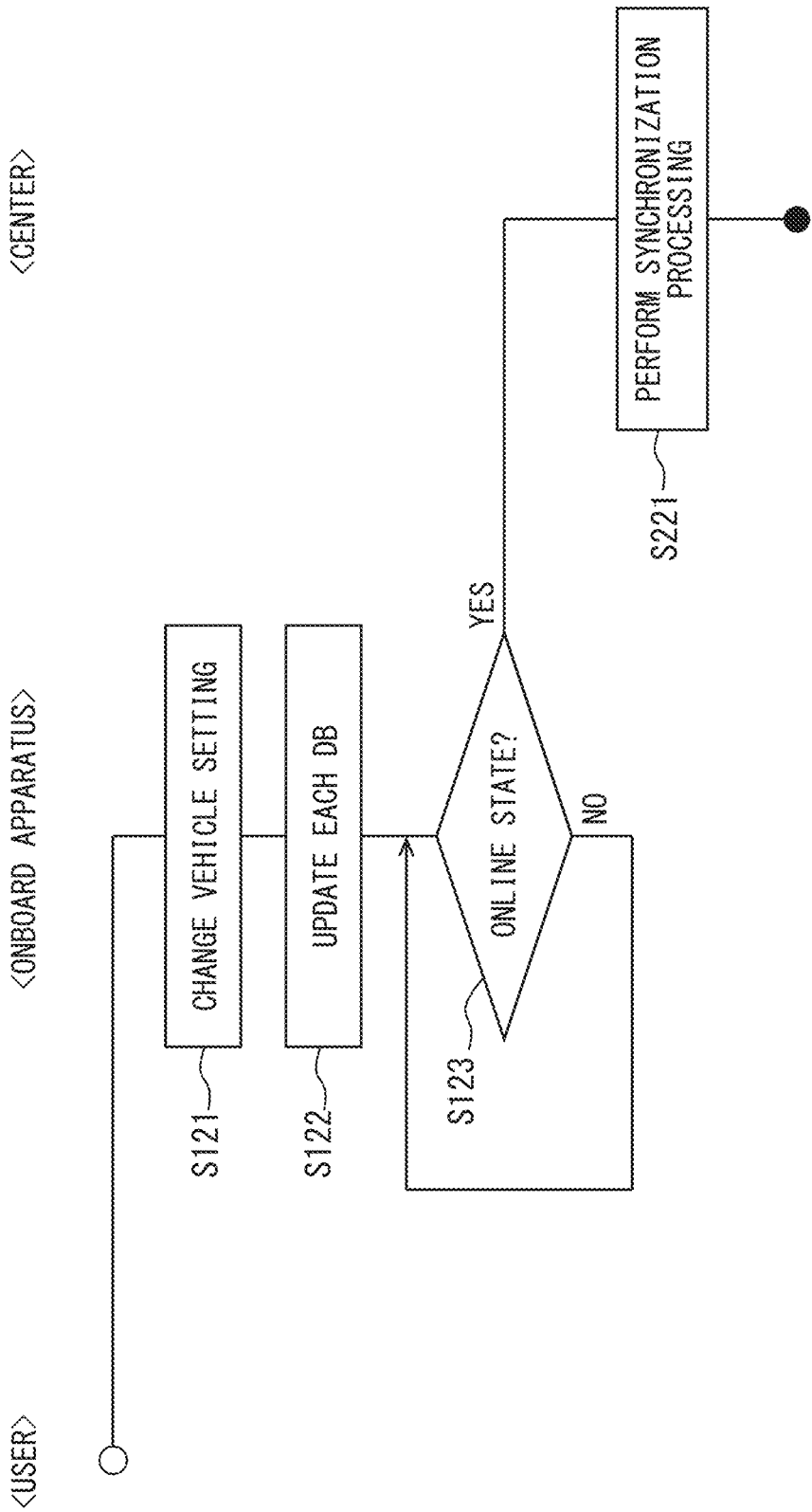
FIG. 13 is a drawing showing an example of the contents of processing related to synchronization processing performed when onboard apparatus-side information is updated offline, according to an embodiment.

[6] Synchronization Processing Performed when Onboard Apparatus-Side Information is Updated Offline Processing related to synchronization processing used when each piece of information stored in the user setting DB 9 and the vehicle setting DB 10 of the onboard apparatus 2 is updated in an offline state may be as shown in FIG. 13, for example. The processing related to synchronization processing shown in FIG. 13 is different from the processing related to synchronization processing shown in FIG. 10 in that Step S123 is added and the like. In this case, after execution of Step S122, the processing proceeds to Step S123.

At Step S123, the control device 11 of the onboard apparatus 2 determines whether an online state has been established. When an online state has been established, at Step 123, a "YES" judgment is made and the processing proceeds to Step S221. Meanwhile, when an online state has not been established, that is, an offline state has been established, at Step S123, a "NO" judgment is made and Step S123 is performed again; that is, Step S123 is repeatedly performed until an online state is established.

In this case, it is assumed that both the onboard apparatus 2 and the center 3 are on; however, for example, if a state of reception of radio waves used for communication is unfavorable, communication can be infeasible between the onboard apparatus 2 and the center 3. In such a case, when a state of radio waves is improved, a transition is caused from an offline state to an online state.

In an online state, at Step S221, the synchronization processing unit 23 of the center 3 updates each piece of information stored in the shared area 18 of the user setting DB 15 and the shared area 20 of the vehicle setting DB 16 to synchronize the information with each piece of information stored in the user setting DB 9 and the vehicle setting DB 10 of the onboard apparatus 2, that is, performs synchronization processing. After execution of Step S221, the processing related to synchronization processing is terminated.

According to the authentication system 1 in the present embodiment described up to this point, when a single vehicle is utilized by not only the owner of the vehicle but also any other user than the owner of the vehicle, the other user than the owner of the vehicle can also be easily authenticated and can utilize various vehicle functions within a range permitted based on predetermined utilization authority. According to the authentication system 1, when a user who is the owner of a vehicle utilizes any other vehicle, such as a company-owned vehicle of his/her company, in addition to his/her owned vehicle, the following advantage is brought about: without necessity for separate adjustment or the like, set values, such as setting of a seat position and setting of an air conditioner, of the other vehicle are reflected similarly to set values of his/her owned vehicle; further, when a car application has been installed in his/her owned vehicle, the car application can also be used in the other vehicle.

According to the authentication system 1 in the present embodiment, various users can conveniently utilize a single vehicle and when a single user utilizes a plurality of vehicles, various vehicle settings and the like can be reflected in each vehicle. According to the present embodiment, therefore, an excellent effect of enhancement of convenience can be obtained with respect to utilization of a vehicle.

In the authentication system 1, user related information stored in the user setting DB 9 of the onboard apparatus 2 and user related information stored in the shared area 18 in the user setting DB 15 of the center 3 are synchronized with each other by synchronization processing; and vehicle related information stored in the vehicle setting DB 10 of the onboard apparatus 2 and vehicle related information stored in the shared area 20 in the vehicle setting DB 16 of the center 3 are synchronized with each other by synchronization processing. That is, identical information is stored and managed in the onboard apparatus 2 and in the center 3. However, the user setting DB 15 of the center 3 includes the non-shared area 19 and the non-shared area 19 holds information, such as information corresponding to a user who has not utilized the vehicle 4, for example, that is not stored in the user setting DB 9 of the onboard apparatus 2.

When utilization of a vehicle is requested from a user in the authentication system 1, first, authentication processing is performed based on each piece of information stored in the user setting DB 9 and the vehicle setting DB 10 of the onboard apparatus 2. At an information insufficiency time, that is, when information corresponding to a target user does not exist in the user setting DB 9 or vehicle setting DB 10 of the onboard apparatus 2, authentication processing is performed based on information stored in the non-shared area 19 in the user setting DB 15 of the center 3. According to this configuration, a user who has not utilized the vehicle 4 can also be appropriately authenticated. In this case, the user setting DB 9 of the onboard apparatus 2 only has to hold information corresponding to a user who has utilized the vehicle 4; therefore, a storage area can be efficiently used.

At an information insufficiency time, in the authentication system 1, the authentication processing unit 12 of the onboard apparatus 2 is capable of performing authentication processing based on user related information stored in the non-shared area 19 in the user setting DB 15 of the center 3. In this case, the authentication processing unit 12 of the onboard apparatus 2 downloads user related information from the non-shared area 19 in the user setting DB 15 of the center 3 before performing authentication processing. With this configuration, when utilization of a vehicle is requested from the same user, authentication processing can be immediately performed only with information in each DB of the onboard apparatus 2.

At an information insufficiency time, in the authentication system 1, the authentication processing unit 22 of the center 3 is capable of performing authentication processing based on user related information stored in the non-shared area 19 in the user setting DB 15 of the center 3. In this case, the authentication processing unit 22 of the center 3 performs authentication processing and further transfers user related information stored in the non-shared area 19 in the user setting DB 15 of the center 3 to the user setting DB 9 of the onboard apparatus 2. With this configuration, when utilization of a vehicle is requested from the same user, authentication processing can be immediately performed only with information in each DB of the onboard apparatus 2.

The authentication system 1 is so configured that: in cases where at least either of information stored in the user setting DB 15 and information stored in the vehicle setting DB 16 of the center 3 is updated in an offline state, in which communication is infeasible between the onboard apparatus 2 and the center 3, synchronization processing is performed when an online state, in which communication is feasible between the onboard apparatus 2 and the center 3, is thereafter established. With this configuration, even when information in each DB on the center 3 side is updated while the onboard apparatus 2 has been transferred to a sleep state, synchronization processing is immediately performed when the onboard apparatus 2 comes back to a normal state; as a result, respective pieces of information stored in each DB of the onboard apparatus 2 and the center 3 can be synchronized with each other without fail.

The authentication system 1 is further so configured that: in cases at least either of information stored in the user setting DB 9 and information stored in the vehicle setting DB 10 of the onboard apparatus 2 is updated in an offline state, synchronization processing is performed when an online state is thereafter established. With this configuration, even when information in each DB on the onboard apparatus 2 side is updated while a state of reception of radio waves used in communication is unfavorable, synchronization processing is immediately performed when a state of radio waves is improved; as a result, respective pieces of information stored in each DB of the onboard apparatus 2 and the center 3 can be synchronized with each other without fail.

Other Embodiments

The present disclosure is not limited to the embodiment described above with reference to the drawings and can be arbitrarily modified, combined, or expanded without departing from the subject matter thereof.

The numerical values and the like indicated in relation to the above embodiment are just an example and are not definite.

With respect to user related information stored in the user setting DB 9 of the onboard apparatus 2 and the shared area 18 in the user setting DB 15 of the center 3, vehicle related information stored in the vehicle setting DB 10 of the onboard apparatus 2 and the shared area 20 in the vehicle setting DB 16 of the center 3, user related information stored in the non-shared area 19 in the user setting DB 15 of the center 3, vehicle related information stored in the non-shared area 21 in the vehicle setting DB 16 of the center 3, and the like, the concrete contents thereof need not be as described in relation to the above embodiment and may be modified as appropriate.

For example, such information as shown in FIG. 14 may be added to information shown in FIG. 7 as vehicle related information stored in the non-shared area 21 in the vehicle setting DB 16 of the center 3. The vehicle related information shown in FIG. 14 is information corresponding to the vehicle 4 mounted with the onboard apparatus 2 and the vehicle related information contains user information includes user information about each of 10 users whose VIN corresponds to the vehicle 4, who are entitled to the vehicle 4, and whose user ID is "001" to "010."

In this case, the user information includes a user ID, a vehicle service ID, a utilization history and an accumulated time. The vehicle service ID is character information assigned to each vehicle service for identifying such a vehicle service as an automatic operation application, for example. The utilization history is information indicating a history of utilization, such as a number of times of utilization of a vehicle service. The accumulated time is information indicating an accumulated time for which a vehicle service is utilized. These pieces of vehicle related information are information need not be stored on the onboard apparatus 2 side. Consequently, these pieces of vehicle related information are stored in the non-shared area 21 in the vehicle setting DB 16 of the center 3; and thus, various types of processing, including billing of a charge according to a number of times of utilization, a duration of utilization, for example, can be appropriately performed.

The onboard apparatus 2 corresponds to an in-vehicle unit. The center 3 corresponds to a vehicle-exterior apparatus. The user setting DB 9 corresponds to a first vehicle-interior storage unit. The vehicle setting DB 10 corresponds to a second vehicle-interior storage unit. The control device 11 corresponds to a vehicle-interior control unit. The user setting DB 15 corresponds to a first vehicle-exterior storage unit. The vehicle setting DB 16 corresponds to a second vehicle-exterior storage unit. The control device 17 corresponds to a vehicle-exterior control unit.

Although the present disclosure has been described in accordance with embodiments, it is understood that the present disclosure is not limited to such embodiments or structures. The present disclosure incorporates various modifications and variations within the scope of equivalents. Furthermore, various combinations and modes, and other combination and modes including only one, more or less element, fall within the spirit and scope of the present disclosure.

The control unit and the techniques thereof according to the present disclosure may be implemented by one or more special-purposed computers. Such a special-purposed computer may be provided (i) by configuring (a) a processor and a memory programmed to execute one or more functions embodied by a computer program, Alternatively, the control unit and method thereof according to the present disclosure may be achieved by a dedicated computer provided by constituting a processor with one or more dedicated hardware logic circuits. Alternatively, the control unit and the method thereof according to the present disclosure may be achieved using one or more dedicated computers constituted by a combination of a processor and a memory programmed to execute one or more functions and a processor formed of one or more hardware logic circuits. The computer program may be stored in a non-transitory tangible computer-readable recording medium as an instruction to be executed by a computer.

What is claimed is:

1. An authentication system comprising:
   an in-vehicle unit that is mounted in a vehicle; and
   a vehicle-exterior apparatus that is provided outside the vehicle,
   wherein
   the in-vehicle unit and the vehicle-exterior apparatus are configured to communicate with each other,
   the in-vehicle unit includes:
      a first vehicle-interior storage unit that stores user related information about a user who utilizes the vehicle;
      a second vehicle-interior storage unit that stores vehicle related information about the vehicle, and
      a vehicle-interior control unit that performs varied processing,
   the vehicle-exterior apparatus includes:
      a first vehicle-exterior storage unit that includes a shared area and a non-shared area for storing the user related information;
      a second vehicle-exterior storage unit that stores the vehicle related information, and
      a vehicle-exterior control unit that performs varied processing;
   the vehicle-interior control unit and the vehicle-exterior control unit perform synchronization processing for bi-directionally synchronizing the user related information stored in the first vehicle-interior storage unit and the user related information stored in the shared area in the first vehicle-exterior storage unit with each other,
   when utilization of the vehicle is requested from a user, the vehicle-interior control unit performs authentication processing to authenticate a target user, who requested the utilization of the vehicle, based on the user related information stored in the first vehicle-interior storage unit and the vehicle related information stored in the second vehicle-interior storage unit and, and when the target user is successfully authenticated by the authentication processing, the vehicle-interior control unit reflects the user related information corresponding to the target user in the vehicle, and
   at an information insufficiency time when information corresponding to the target user does not exist in the user related information stored in the first vehicle-interior storage unit or the vehicle related information stored in the second vehicle-interior storage unit, the vehicle-interior control unit or the vehicle-exterior control unit performs the authentication processing based on the user related information stored in the non-shared area in the first vehicle-exterior storage unit.

2. The authentication system according to claim 1, wherein
   at the information insufficiency time, the vehicle-interior control unit performs the authentication processing based on the user related information stored in the non-shared area in the first vehicle-exterior storage unit.

3. The authentication system according to claim 2, wherein
   at the information insufficiency time, the vehicle-interior control unit transfers the user related information stored in the non-shared area in the first vehicle-exterior storage unit to the first vehicle-interior storage unit and then performs the authentication processing.

4. The authentication system according to claim 1, wherein
   at the information insufficiency time, the vehicle-exterior control unit performs the authentication processing based on the user related information stored in the non-shared area in the first vehicle-exterior storage unit.

5. The authentication system according to claim 4, wherein
   when the authentication processing is performed at the information insufficiency time, the vehicle-exterior control unit transfers the user related information stored in the non-shared area in the first vehicle-exterior storage unit to the first vehicle-interior storage unit.

6. The authentication system according to claim 1, wherein
   in a case where information stored in the first vehicle-exterior storage unit is updated in an offline state, in which communication is infeasible between the in-vehicle unit and the vehicle-exterior apparatus, the synchronization processing is performed when an online state, in which communication is feasible between the in-vehicle unit and the vehicle-exterior apparatus, is thereafter established.

7. The authentication system according to claim 1, wherein
   in a case where information stored in the first vehicle-interior storage unit is updated in an offline state in which communication is infeasible between the in-vehicle unit and the vehicle-exterior apparatus, the synchronization processing is performed when an online state, in which communication is feasible between the in-vehicle unit and the vehicle-exterior apparatus, is thereafter established.

8. The authentication system according to claim 1, wherein
   the second vehicle-exterior storage unit contains a shared area and a non-shared area, and in the synchronization processing, the vehicle-interior control unit and the vehicle-exterior control unit bi-directionally synchronize also the vehicle related information stored in the second vehicle-interior storage unit and the vehicle related information stored in the shared area in the second vehicle-exterior storage unit with each other.

9. The authentication system according to claim 1, wherein
the user related information includes permission information indicating authority of utilization of a vehicle function, authentication information for authenticating the user, and service setting information indicating a set value of a service of the vehicle.

10. The authentication system according to claim 1, wherein
the vehicle related information includes vehicle identification information for identifying a vehicle and user identification information for identifying a user.

11. The authentication system according to claim 1, wherein
the authentication processing includes identifying the target user and determining whether to permit utilization of the vehicle requested from the target user.

12. An authentication method comprising steps of:
storing user related information about a user who utilizes a vehicle in a first vehicle-interior storage unit provided in an in-vehicle unit mounted in the vehicle;
storing vehicle related information about the vehicle in a second vehicle-interior storage unit provided in the in-vehicle unit;
storing the user related information in a first vehicle-exterior storage unit provided in a vehicle-exterior apparatus provided outside the vehicle and containing a shared area and a non-shared area;
storing the vehicle related information in a second vehicle-exterior storage unit provided in the vehicle-exterior apparatus;
performing synchronization processing to bi-directionally synchronize the user related information stored in the first vehicle-interior storage unit and the user related information stored in the shared area in the first vehicle-exterior storage unit with each other;
when utilization of the vehicle is requested from a user,
performing authentication processing to authenticate a target user, who requested utilization of the vehicle, based on the user related information stored in the first vehicle-interior storage unit and the vehicle related information stored in the second vehicle-interior storage unit and, when the target user is successfully authenticated by the authentication processing, reflecting the user related information corresponding to the target user in the vehicle, and
at an information insufficiency time when information corresponding to the target user does not exist in the user related information stored in the first vehicle-interior storage unit or the vehicle related information stored in the second vehicle-interior storage unit, performing the authentication processing based on the user related information stored in the non-shared area in the first vehicle-exterior storage unit.

* * * * *